(12) United States Patent
Fargo et al.

(10) Patent No.: US 8,564,167 B2
(45) Date of Patent: Oct. 22, 2013

(54) 3T-Y WINDING CONNECTION FOR THREE PHASE MULTIPLE-SPEED MOTOR

(75) Inventors: Vincent P. Fargo, St. Louis, MO (US); Pingshan Cao, Jiangsu (CN); Xin Li, Jiangsu (CN)

(73) Assignee: Emerson Electric Co., St. Louis, MO (US)

( * ) Notice: Subject to any disclaimer, the term of this patent is extended or adjusted under 35 U.S.C. 154(b) by 613 days.

(21) Appl. No.: 12/862,617

(22) Filed: Aug. 24, 2010

(65) Prior Publication Data
US 2011/0309785 A1     Dec. 22, 2011

(30) Foreign Application Priority Data
Jun. 18, 2010   (CN) .......................... 2010 1 0204549

(51) Int. Cl.
*H02K 1/00*     (2006.01)
(52) U.S. Cl.
USPC ........................... 310/179; 310/184; 310/198
(58) Field of Classification Search
USPC .......... 310/179–180, 184, 198, 191, 209, 166
See application file for complete search history.

(56) References Cited

U.S. PATENT DOCUMENTS

| | | | |
|---|---|---|---|
| 1,682,430 A * | 8/1928 | Shenfer ......................... | 310/166 |
| 2,397,183 A * | 3/1946 | Kilgore et al. .................. | 416/40 |
| 4,103,213 A | 7/1978 | Landgraf | |
| 4,322,665 A | 3/1982 | Landgraf | |
| 4,363,985 A * | 12/1982 | Matsuda et al. ............... | 310/184 |
| 5,134,332 A * | 7/1992 | Nakamura et al. ............. | 310/208 |
| 5,760,567 A * | 6/1998 | Nakamura et al. ............. | 318/777 |
| 5,825,111 A | 10/1998 | Fei | |
| 5,831,367 A | 11/1998 | Fei et al. | |
| 5,990,590 A * | 11/1999 | Roesel et al. .................. | 310/113 |
| 6,066,904 A | 5/2000 | Fei et al. | |
| 6,114,790 A | 9/2000 | Fei | |
| 6,175,209 B1 | 1/2001 | Fei | |
| 6,255,755 B1 * | 7/2001 | Fei ................................. | 310/184 |
| 6,271,639 B1 | 8/2001 | Fei | |
| 6,333,578 B1 * | 12/2001 | Nakamura et al. ............. | 310/166 |
| 6,707,214 B1 | 3/2004 | Fei | |
| 6,815,926 B2 | 11/2004 | Fei et al. | |
| 7,598,648 B2 * | 10/2009 | Fei ................................. | 310/184 |
| 2010/0039060 A1 | 2/2010 | Fargo et al. | |

* cited by examiner

*Primary Examiner* — Thanh Lam
(74) *Attorney, Agent, or Firm* — Harness, Dickey & Pierce, P.L.C.

(57) ABSTRACT

A three-phase, multi-speed electric induction motor assembly is configured to include a controller to change motor speeds. The motor assembly includes a stator core assembly, a pair of main winding coil groups corresponding with each phase, and a pair of selectable extra winding coil groups corresponding with each phase. During the lower-speed operation, the controller connects a first set of three leads to a power source such that only the main coil groups are energized. During the higher-speed operation, the controller connects a second set of three leads to the power source such that both the main coil groups and the selectable extra coil groups are energized.

30 Claims, 12 Drawing Sheets

US 8,564,167 B2

3T-Y WINDING CONNECTION FOR THREE PHASE MULTIPLE-SPEED MOTOR

CROSS REFERENCE TO RELATED APPLICATION

The present application claims the benefit of and priority from Chinese Patent Application No. 201010204549.4, filed Jun. 18, 2010, the entire disclosure of which is hereby incorporated by reference herein.

BACKGROUND OF THE INVENTION

1. Field of the Invention

The present invention relates generally to a three-phase, multi-speed electric induction motor assembly. More specifically, the present invention concerns a three-phase, multi-speed electric induction motor assembly that includes selectable extra winding coil groups that are energized only during a selected speed operating mode to improve balanced motor efficiency between multiple speed operating modes.

2. Discussion of the Prior Art

Those of ordinary skill in the art will appreciate that three-phase electric induction motors are known to be generally effective and are commonly used in a variety of industrial applications. Furthermore, three-phase electric induction motors that can operate at multiple speeds, such as a two-speed motor, may be desirable in certain applications where a load is to be driven at different speeds based upon operational requirements. In order to facilitate two operating speeds for three-phase motors known in the art, power leads of the three-phase motor are typically connected to an appropriate controller that can switch the leads that are connected to a power source to thereby change the effective number of poles (and consequently the speed) of the motor.

Traditionally, either a YY-Δ or a YY-Y winding connection between main winding coil groups has been used to provide a three-phase motor with a low-speed operation mode and a high-speed operation mode, as is generally known in the art. While the YY-Δ and the YY-Y winding connection forms have been satisfactory in some respects, both connection forms present difficulty in balancing both low-speed efficiency and high-speed efficiency, leading to drawbacks in operating costs. Such difficulty in balancing efficiency in both the low-speed mode and the high-speed mode may be particularly detrimental when trying to drive a light load at a very high efficiency.

In a conventional YY-Δ winding connection form for a three-phase, two-speed motor, which is depicted and described in detail below, a pair of main coil groups corresponding to each of the three power phases is provided and the main coil groups are connected to one another as generally known in the art. All of the coil groups are energized during both low-speed and high-speed operation modes. In the YY-Δ winding connection form, the high-speed mode is often too weak, and the low-speed mode is often too strong. Such a connection form thus makes the low-speed operation have a tendency to become very saturated at a light load, leading to a generally lower efficiency during the low-speed mode.

In a conventional YY-Y winding connection form for a three-phase, two-speed motor, which is depicted and described in detail below, a pair of main coil groups corresponding to each of the three power phases is provided and the main coil groups are connected to one another as generally known in the art. All of the coil groups are energized during both low-speed and high-speed operation modes. In the YY-Y winding connection form, the high-speed mode is often too strong, and the low-speed mode is often too weak. Such a connection form thus makes the high-speed operation have a tendency to become very saturated at a light load, leading to a generally lower efficiency during the high-speed mode.

Those of ordinary skill in the art will appreciate that the difference in speed mode efficiencies between the YY-Δ and the YY-Y winding connection forms have required a choice to be made as to which speed mode efficiency is of greater importance in a given application. Even with such a choice, it remains undesirable to suffer a lower efficiency during one of the speed modes, especially when trying to drive a light load at a very high efficiency.

SUMMARY

According to an aspect of the present invention, an inventive 3T-Y winding connection form has been developed for use in a three-phase, multi-speed electric induction motor. The new 3T-Y winding connection form includes a special winding distribution to improve lower-speed efficiency over the known prior art connection form options. Furthermore, the new 3T-Y winding connection form includes a unique selectable extra winding coil group that corresponds with each main winding coil group for each phase to improve higher-speed efficiency over the known prior art connection form options. Thus, the new 3T-Y winding connection form effectively balances multiple speed efficiencies in a manner unrealized by prior art winding connections.

The unique selectable extra winding coil groups are preferably energized only during higher-speed operation and serve to balance high-speed and low-speed breakdown torque, depending on design requirements, and to increase the number of high-speed effective turns. In one embodiment, a three-phase, multi-speed electric induction motor including the new 3T-Y winding connection form achieved an efficiency of at least about 84% during lower-speed mode operation and an efficiency of at least about 88% during higher-speed mode operation. These efficiency improvements are realized while slightly reducing the slot fill percentage relative to prior art connections, and while using approximately equal weights of winding material (e.g., copper wire). Thus, the benefits of the new 3T-Y winding connection form may be obtained without significantly adding to production costs.

According to one aspect of the present invention, an improvement is provided in a three-phase, multi-speed electric induction motor that has a 2n-pole, higher-speed mode and a 4n-pole, lower-speed mode, where n is an integer greater than or equal to one. The motor includes a stator core assembly that presents axial slots and defines a central axial bore for receiving a rotor assembly, with n pair of main winding coil groups corresponding with each phase being disposed within the slots of the core assembly. The main coil groups are energized, with the main coil groups within each phase being connected to one another in serial form, when the motor is in the lower-speed mode. The improvement includes a selectable extra winding coil group corresponding with each main winding coil group. The selectable extra winding coil groups are disposed within the slots of the core assembly. The main coil groups and the selectable extra coil groups both energized, with the main coil groups within each phase being connected to one another in parallel form and the selectable extra coil groups within each phase being connected to one another in serial form, when the motor is in the higher-speed mode.

According to another aspect of the present invention, a three-phase, multi-speed electric induction motor assembly is provided. The motor assembly includes a stator core assembly, a pair of main winding coil groups corresponding with each phase, and a pair of selectable extra winding coil groups corresponding with each phase. The coil groups are selectively adapted for a lower-speed operation and for a higher-speed operation. The lower-speed operation is defined by a first set of three leads being configured for connection to a power source such that only the main coil groups are energized. The higher-speed operation is defined by a second set of three leads being configured for connection to the power source such that the main coil groups and the selectable extra coil groups are both energized.

Another aspect of the present invention concerns an electric induction motor assembly. The motor assembly includes a stator core assembly, a first phase main winding group wound on the stator core assembly and including a pair of first main winding coil groups, a second phase main winding group wound on the stator core assembly and including a pair of second main winding coil groups, and a third phase main winding group wound on the stator core assembly and including a pair of third main winding coil groups. The motor also includes a first phase selectable extra winding group wound on the stator core assembly and including a pair of first selectable extra winding coil groups, a second phase selectable extra winding group wound on the stator core assembly and including a pair of second selectable extra winding coil groups, and a third phase selectable extra winding group wound on the stator core assembly and including a pair of third selectable extra winding coil groups. The winding groups are electrically connected during a 4-pole, low-speed operation such that only the first, second, and third main coil groups are energized, with the respective pairs of the first, second, and third main coil groups being connected to one another in serial form. The winding groups are electrically connected during a 2-pole, high-speed operation such that the first, second, and third main coil groups and the first, second, and third selectable extra coil groups are energized, with the respective pairs of the first, second, and third main coil groups being connected to one another in parallel form and the respective pairs of the first, second, and third selectable extra coil groups being connected to one another in serial form.

This summary is provided to introduce a selection of concepts in a simplified form that are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein:

FIG. 1 is a partial cutaway isometric view of an electric induction motor assembly constructed in accordance with the principles of an embodiment of the present invention, illustrating a rotor assembly and a stator core assembly disposed within a motor case that includes opposite endshields, and a shaft partially extending through one of the endshields, depicting in detail internal components of the motor assembly including the stator core assembly comprising a plurality of axially stacked stator laminations presenting axial slots;

Figure 1:
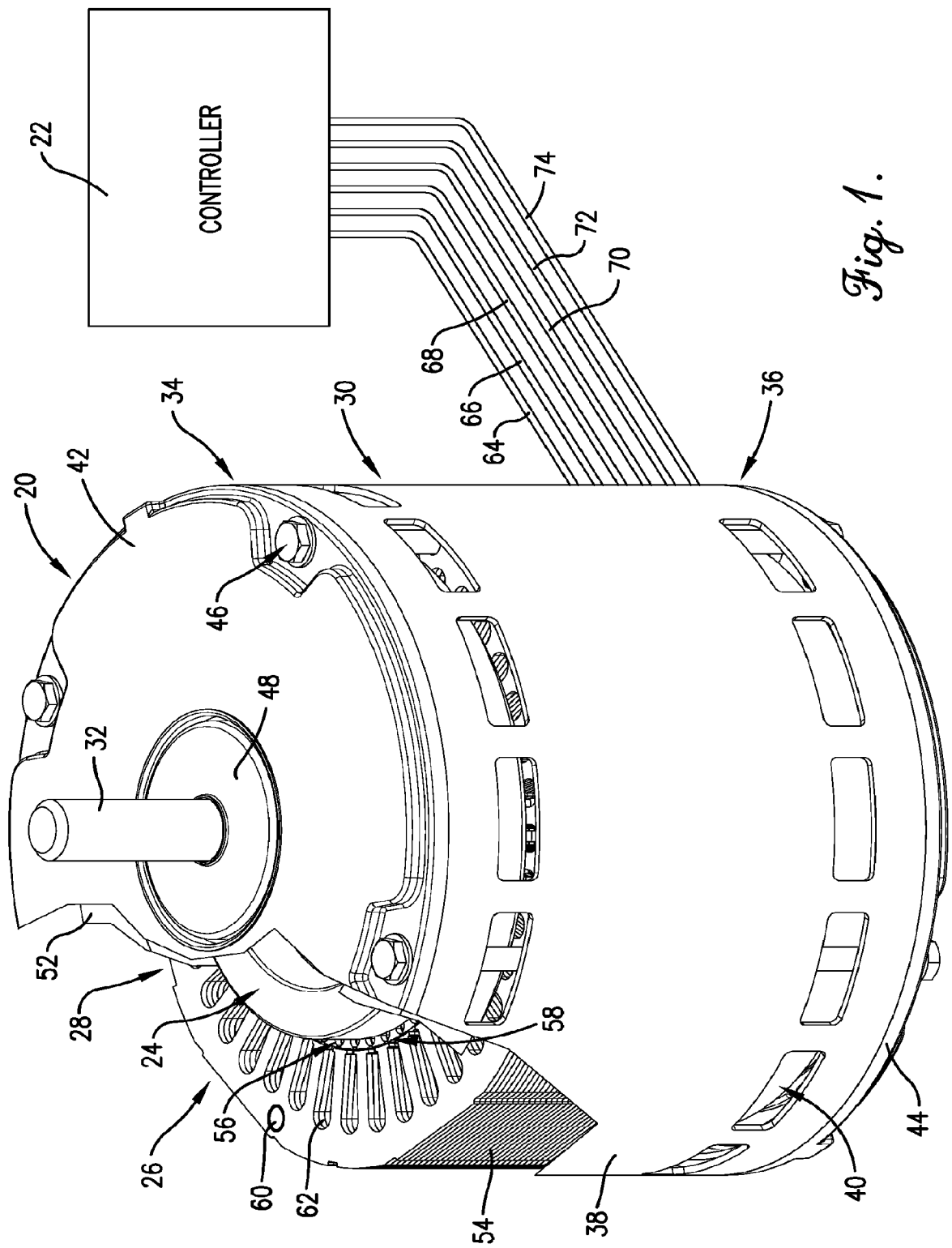
Figure 7A:
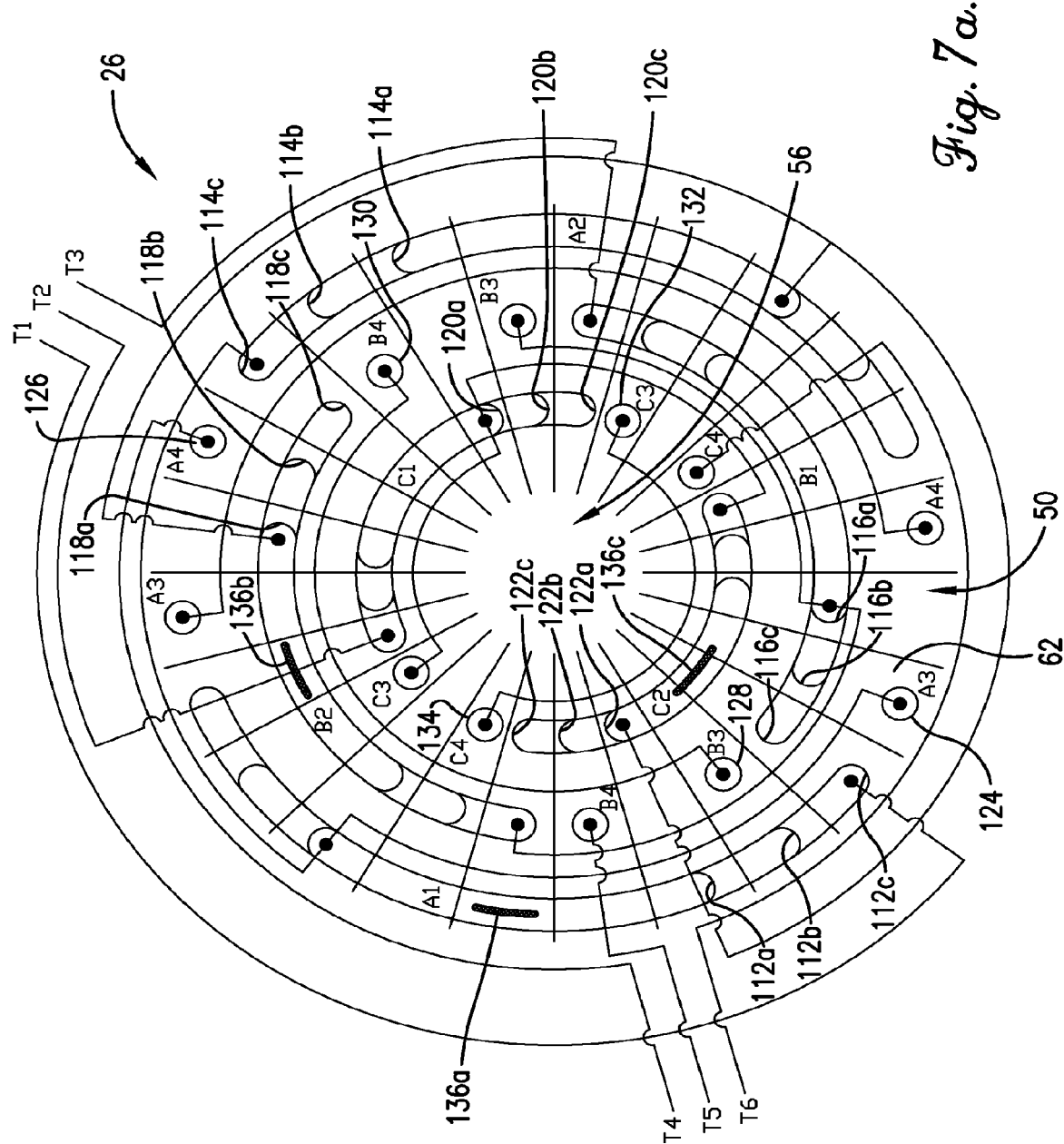
Figure 7B:
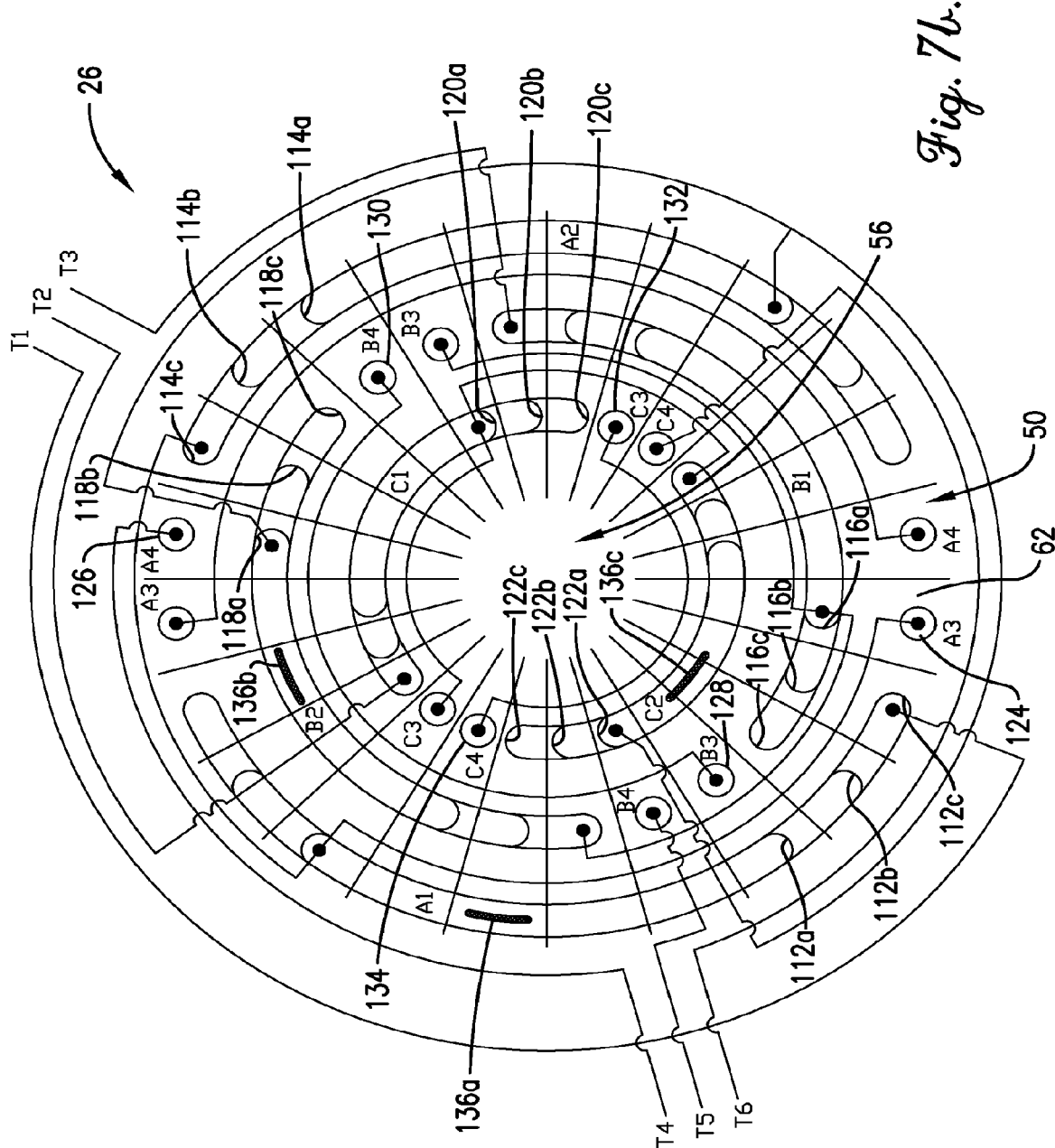
Figure 8:
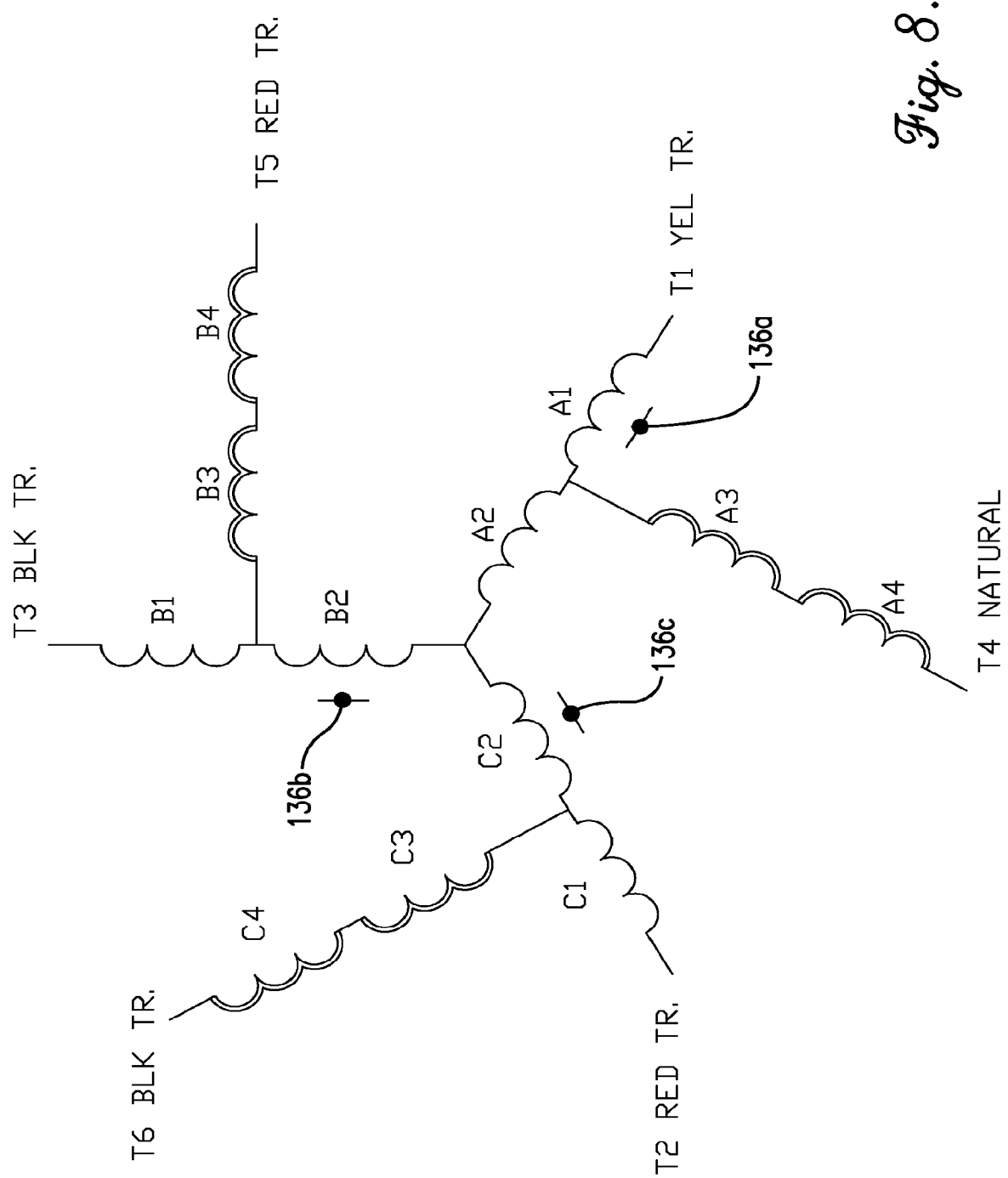
Figure 9A:
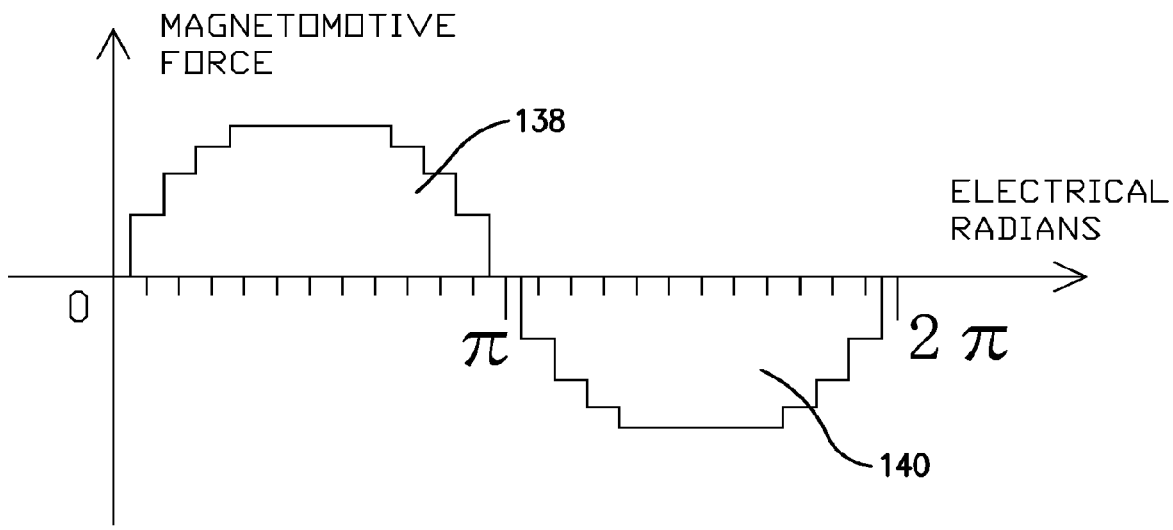
Figure 9B:
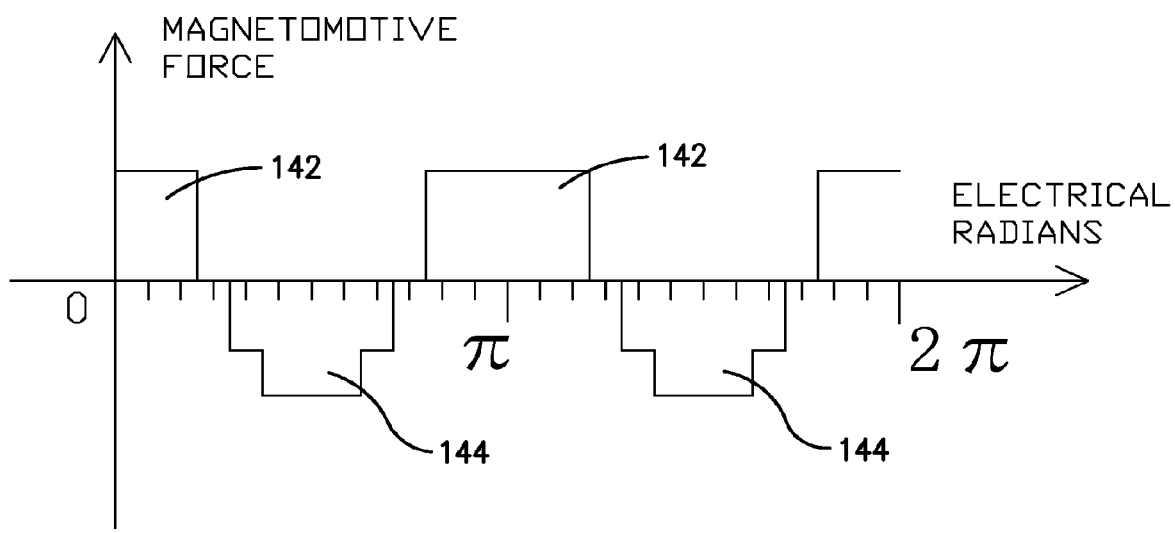

FIG. 7a is a schematic winding distribution diagram of a three-phase, multi-speed electric induction motor assembly having a 3T-Y winding connection constructed in accordance with the principles of a preferred embodiment of the present invention, such as the motor assembly of FIG. 1, illustrating a pair of main winding coil groups corresponding with each phase arranged within the slots of the stator core assembly, and a pair of selectable extra winding coil groups corresponding with each phase arranged within the slots of the stator core assembly adjacent the corresponding main coil group for each phase, with a combination of the main winding coil group and the associated selectable extra coil group for each phase circumferentially spanning ten slots;

FIG. 7b is a schematic winding distribution diagram of a three-phase, multi-speed electric induction motor assembly having a 3T-Y winding connection constructed in accordance with the principles of a preferred embodiment of the present invention, such as the motor assembly of FIG. 1, substantially similar to FIG. 7a, but with the combination of the main winding coil group and the associated selectable extra coil group for each phase circumferentially spanning eleven slots;

FIG. 8 is a schematic winding connection diagram of a three-phase, multi-speed electric induction motor assembly having a 3T-Y winding connection constructed in accordance with the principles of a preferred embodiment of the present invention, such as the motor assembly depicted in FIGS. 7a and 7b, illustrating the 3T-Y winding connection form between main winding coil groups and between the selectable extra winding coil groups;

FIG. 9a is a chart including a general diagram depicting magnetomotive force versus electrical radians for the three-phase, multi-speed motor assembly depicted in FIGS. 7 and 8 operating in a 2-pole, higher-speed operation mode; and FIG. 9b is a chart including a general diagram depicting magnetomotive force versus electrical radians for the three-phase, multi-speed motor assembly depicted in FIGS. 7 and 8 operating in a 4-pole, lower-speed operation mode.

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

With initial reference to FIG. 1, a three-phase, multi-speed electric induction motor assembly 20 constructed in accordance with the principles of an embodiment of the present invention is depicted for use in various applications. While the motor assembly 20 is useful in various applications, the illustrated embodiment has particular utility when the motor assembly 20 is configured to include a digital controller 22 to drive a light load. More specifically, the motor assembly 20 is notably advantageous when the motor assembly 20 includes the digital controller 22 and is configured to drive a hermetic compressor of the scroll, rotary, or piston types (not shown).

It is noted that in an industrial application, the digital controller 22 may be a separable component of the motor assembly 20 (as depicted), or may be integrated into either the motor assembly 20 or the device to be driven thereby without departing from the teachings of the present invention. Moreover, it is specifically noted that the motor assembly 20 need not take the form of a so-called "stand alone" motor assembly (as shown in FIG. 1), but may instead be incorporated with the device to be driven thereby, such as a compressor assembly, while remaining firmly within the ambit of the present invention. In such an example (e.g., where the motor assembly 20 is configured to drive a compressor assembly, with both the motor assembly 20 and the compressor assembly being disposed within a common body), the motor assembly 20 may form part of a larger unitary component, such as a device commonly referred to as simply a compressor, as will be readily appreciated by one of ordinary skill in the art.

As is generally customary, the motor assembly 20 broadly includes a rotor assembly 24, which is rotatable about an axis, and a stator assembly 26. The rotor assembly 24 and the stator assembly 26 are both generally contained within an internal motor chamber 28 that is broadly defined by a motor case 30. The rotor assembly 24 includes an axially disposed shaft 32 that projects outwardly from one end of the motor case 30.

The illustrated motor case 30 is generally cylindrical and presents opposite axial margins 34, 36. The motor case 30 comprises a shell element 38 that includes a plurality of vent openings 40 disposed around a radially outer margin of the shell 38 to present a vented shell 38. It will be readily appreciated by one of ordinary skill in the art, however, that the alternative use of a non-vented shell (not shown) is clearly within the ambit of the present invention. The motor case 30 further comprises endshields 42, 44 disposed adjacent the axial margins 34, 36, respectively, and secured to the shell 38. In the illustrated embodiment, each endshield 42, 44 is secured to the shell 38 with a plurality of fasteners comprising bolt-and-nut assemblies 46. It will be readily appreciated by one of ordinary skill in the art, however, that either or both of the endshields 42, 44 could be alternatively secured to the shell 38, such as by welding or being integrally formed therewith, without departing from the teachings of the present invention.

With continued reference to FIG. 1, it is noted that the endshields 42, 44 are substantially similar in many respects, with the notable exception that the endshield 42 is predominantly solid, while the endshield 44 (not depicted in detail) includes a plurality of vent openings (not shown) defined therethrough. Such vent openings may permit vent air to flow in a generally axial direction from outside to inside the motor chamber 28 to cool the motor assembly 20 from heat generated during operation. As will be readily appreciated by one of ordinary skill in the art upon review of this disclosure, a fan (not shown) configured for rotation with the rotor assembly 24 may be used to pull cooling vent air through the vent openings, into the motor chamber 28, and push the air out of the vent openings 40 in the shell 38 in order to provide a cooling effect to the motor assembly 20. While only one exemplary embodiment is depicted here, of course alternative cooling and/or venting arrangements, including a totally enclosed motor having a non-vented shell (not shown) and endshields without vent openings (such as the solid endshield 42), are contemplated and are clearly within the ambit of the present invention.

As will be readily understood by one of ordinary skill in the art, a bearing assembly (not shown) is operably associated with a portion of each endshield 42, 44 for rotatably supporting the shaft 32. Additionally, a cover 48 is operably secured to a portion of the endshield 42 to substantially separate the internal motor chamber 28 from outside elements. The cover 48 includes a hole extending therethrough to surround and facilitate passthrough of the shaft 32. It is noted that a predominantly solid cover (not shown) is similarly operably secured to a portion of the endshield 44, but without facilitating passthrough of the shaft 32.

As will be readily appreciated by one of ordinary skill in the art upon review of this disclosure, many of the above-described general components of the motor assembly 20 are substantially conventional in nature, and various aspects of such components may take alternative forms and/or otherwise vary significantly from the illustrated embodiment without departing from the teachings of the present invention. Furthermore, it will be understood by one of ordinary skill in the art that several of the above-described general components (e.g., a shell, endshields, and/or covers) may not be included in some applications of the motor assembly 20, such as where the motor assembly 20 is incorporated into a common body with the device to be driven thereby (e.g., a compressor as described above). Any such modifications to generally conventional components of the motor assembly 20 are not intended to impact the scope of the present invention, which is defined by the claims.

Turning briefly now to construction details of the stator assembly 26, one of ordinary skill in the art will readily understand that the stator assembly 26 depicted in FIG. 1 broadly includes a stator core 50 and a generally axially concentric winding 52. The illustrated stator core 50 is comprised of a plurality of axially stacked stator laminations 54, as is generally known in the art. It is noted that the winding 52 depicted in FIG. 1 is shown in a conventional schematic form, but that additional details regarding the winding 52 are described below. As will be readily appreciated by one of ordinary skill in the art, the particular configuration of the winding 52 may directly impact the power, torque, voltage, operational speed, number of polls, etc. of the induction motor assembly 20.

As is somewhat conventional in the art, each individual stator lamination 54 includes a substantially annular steel body, such that the plurality of axially stacked stator laminations 54 forming the stator core 50 cooperatively presents a generally central axial bore 56 for receiving the rotor assembly 24. As will be readily understood by one of ordinary skill in the art, an air gap 58 extends radially between the stator core 50 of the stator assembly 26 and the rotor assembly 24, such that the rotor assembly 24 is able to rotate freely within the stator assembly 26. The plurality of axially stacked stator laminations 54 forming the stator core 50 also cooperatively presents a plurality of holes 60 extending axially therethrough, such that the bolt-and-nut assemblies 46 are passed through the holes 60 upon construction of the motor assembly 20.

Additionally, the plurality of axially stacked stator laminations 54 forming the stator core 50 further cooperatively presents a plurality of generally arcuate slots 62 extending axially therethrough, with each depicted slot 62 being in communication with the air gap 58. As will be readily understood by one of ordinary skill in the art, wires comprising the winding 52 pass through the slots 62 for receipt therein. It is noted that in the illustrated embodiment, the stator core 50 of the stator assembly 26 includes twenty-four slots 62, although various numbers of slots may be alternatively provided without departing from the teachings of the present invention.

The rotor assembly 24 need not be described in detail herein, with it being sufficient for the understanding of one of ordinary skill in the art to note that the rotor assembly 24 may be of conventional construction as is generally known in the art. For example, the rotor assembly 24 may comprise an exposed bar, squirrel cage rotor, although one of ordinary skill in the art will readily appreciate that various configurations of rotor assemblies may be provided while remaining within the ambit of the present invention.

Shifting now to operation considerations of three-phase motors, and to details of the winding used therein, one of ordinary skill in the art will readily appreciate that three-phase electric induction motors are commonly used in a variety of industrial applications (such as to drive pumps, fans, blowers, compressors, and the like). As is generally known, a three-phase motor is often more compact and can be less costly than a single-phase motor of the same voltage class and duty rating. In addition, many three-phase motors often exhibit less vibration and may therefore last longer than corresponding single-phase motors of the same power used under the same conditions.

Three-phase electric induction motors can be configured to operate multiple speeds, which may be desirable in certain applications where the load is to be driven at different speeds based upon operational requirements. In the exemplary embodiment described herein, the discussion will focus on a two-speed motor that includes a high-speed operating mode and a low-speed operating mode. The principles of the present invention, however, are not limited to a two-speed motor, but may alternatively be applied to motor that includes additional operating speed modes.

A common way to change operating speed modes within a three-phase motor involves changing the number of effective poles that are generated for each operating speed mode. For the exemplary embodiment described herein, it is supposed that the three-phase, multi-speed electric induction motor assembly 20 includes a 2n-pole, high-speed mode and a 4n-pole, low-speed mode, where n is an integer greater than or equal to one. More specifically, the detailed discussion herein focuses on an embodiment where n is equal to one, such that the motor assembly 20 presents a 2-pole, high-speed mode and a 4-pole, low-speed mode. Such an exemplary embodiment, however, is not limiting on the principles of the present invention, as higher integer values of n, corresponding to higher multiples of effective poles generated, remain within the ambit of the present invention.

The three-phase electric induction motor assembly 20 is driven by energizing the winding 52 with three phases of alternating current from a power source (not shown), with the phases being commonly designated as A, B, and C phases (it is noted that such conventional phase notation is used consistently herein). Each of the A, B, and C phases are essentially equal in magnitude, but are offset from one another by 120° ($2\pi/3$ radians), as will be readily understood by one of ordinary skill in the art. By dividing the winding 52 into at least one winding coil group for each phase—here, into n pair of main winding coil groups corresponding with each phase— the three offset A, B, and C phases cooperatively create a rotating magnetic field within the stator assembly 26. In the detailed discussion herein, n is equal to one, such that the winding 52 includes a pair of main winding coil groups corresponding with each phase. The rotating magnetic field within the stator assembly 26 induces a corresponding rotating magnetic field within the rotor assembly 24, thereby causing rotation of the rotor assembly 24, as will be readily understood by one of ordinary skill in the art.

In order to facilitate the high and low operating speeds for the three-phase motor, power leads of the coil groups comprising the winding 52 are connected to an appropriate controller that can switch the leads that are connected to the power source to thereby change the effective number of poles (and consequently the speed) of the motor. With reference to FIG. 1, in the depicted embodiment of the present invention, the winding coil groups cooperatively present six leads 64, 66, 68, 70, 72, 74 that are connected to the controller 22 to be selectively connected to the power source (not shown) as described in detail below.

In addition to being connected to the controller 22, the winding coil groups are interconnected with one another, such that selectively energizing certain ones of the leads 64-74 alters the effective poles generated to thereby switch between the operating speed modes. Traditionally, either a YY-Δ or a YY-Y winding connection between the winding coil groups has been used to provide a three-phase motor with a low-speed operation mode and a high-speed operation mode. While the YY-Δ and the YY-Y winding connection forms have been satisfactory in some respects, both connection forms present difficulty in balancing both low-speed efficiency and high-speed efficiency, leading to drawbacks in operating costs. Such difficulty in balancing efficiency in both the low-speed mode and the high-speed mode may be particularly detrimental when trying to drive a light load at a very high efficiency.

Figure 2A:
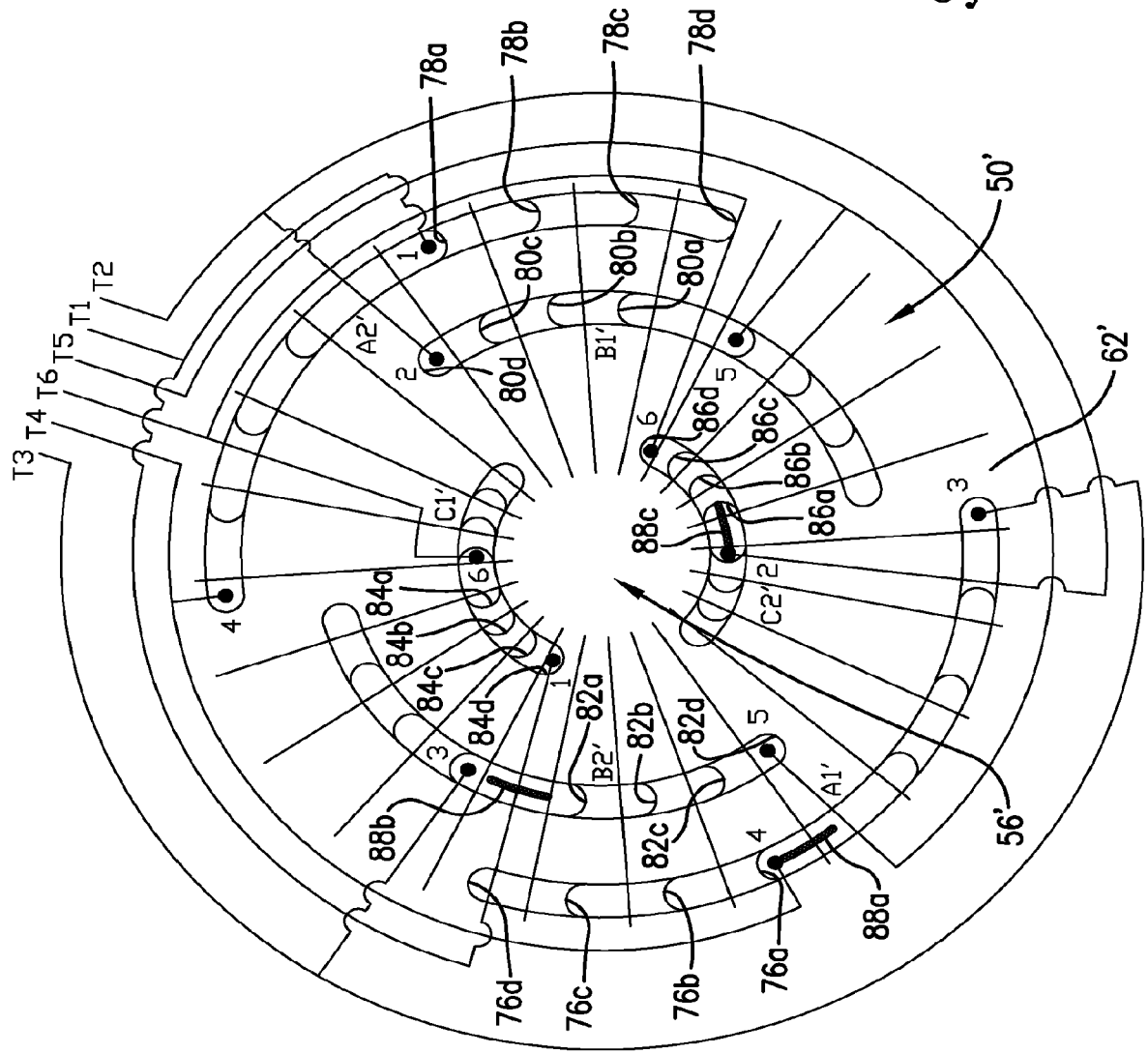
FIG. 2a is a schematic winding distribution diagram of a prior art three-phase, two-speed motor having a YY-Δ winding connection, illustrating a pair of main winding coil groups corresponding with each phase arranged within slots of a stator core assembly, with the main winding coil groups each circumferentially spanning nine slots.
Figure 2B:
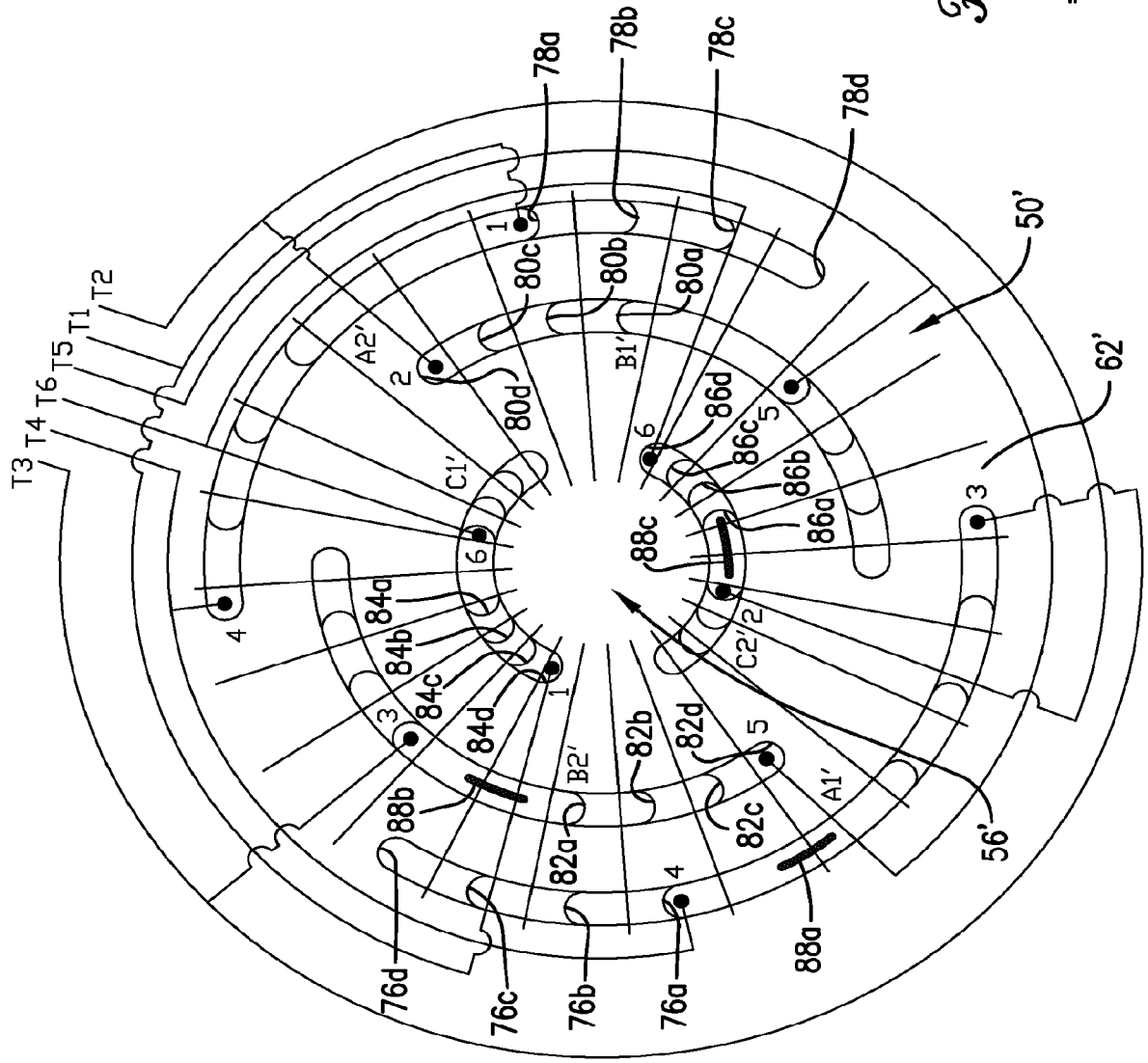
FIG. 2b is a schematic winding distribution diagram of a prior art three-phase, two-speed motor having a YY-Δ winding connection, substantially similar to FIG. 2a, but with the main winding coil groups each circumferentially spanning ten slots.
Figure 3:
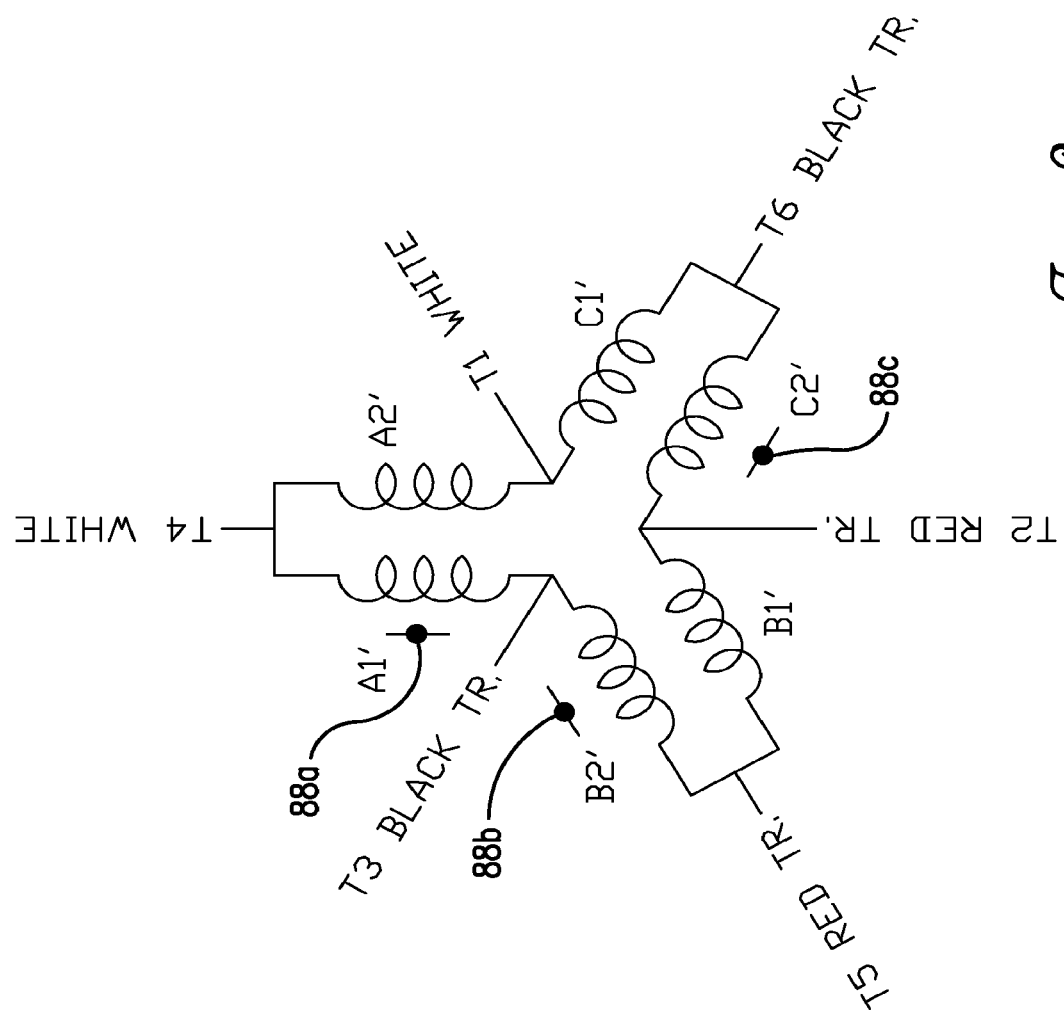
FIG. 3 is a schematic winding connection diagram of a prior art three-phase, two-speed motor having a YY-Δ winding connection, such as the motor depicted in FIGS. 2a and 2b, illustrating the YY-Δ winding connection form between main winding coil groups.

With attention first to the prior art YY-Δ winding connection schematically depicted in FIGS. 2a, 2b, and 3, a prior art three-phase, two-speed motor (not shown) is provided with a YY-Δ winding connection. FIGS. 2a and 2b depict schematic winding distribution diagrams of a pair of main winding coil groups A1', A2', B1', B2', C1', C2' corresponding with each phase arranged within slots 62' of a stator core 50'. It is noted that FIGS. 2a and 2b are substantially similar, with the main winding coil groups A1', A2', B1', B2', C1', C2' each circumferentially spanning nine slots 62' in FIG. 2a and each circumferentially spanning ten slots 62' in FIG. 2b.

In both FIGS. 2a and 2b, the main winding coil groups A1', A2', B1', B2', C1', C2' are disposed within the slots 62' and surround a central bore 56' that is configured to receive a rotor assembly (not shown) as will be readily appreciated by one of ordinary skill in the art. Each of the main winding coil groups includes four coils, such that the coil group A1' includes coils 76a, 76b, 76c, 76d, and the coil group A2' includes coils 78a, 78b, 78c, 78d. Similarly, the coil group B1' includes coils 80a, 80b, 80c, 80d, and the coil group B2' includes coils 82a, 82b, 82c, 82d. Also, the coil group C1' includes coils 84a, 84b, 84c, 84d, and the coil group CT includes coils 86a, 86b, 86c, 86d.

A temperature sensor 88a, 88b, 88c is disposed generally centrally within one group of each phase pair of main coil groups, as will be readily understood by one of ordinary skill in the art upon review of this disclosure. The temperature sensors 88 facilitate data collection of the heat generated within each phase pair of coil groups. Each of the coils 76-86 includes a discrete number of turns, which may be different from other coils, although it is noted that the number of turns of corresponding coils between the phases (e.g., coil 76a of group A1' and coil 80a of group B1') are typically equal, as will be readily appreciated by one of ordinary skill in the art.

With attention now to FIG. 3, a schematic winding connection diagram of the prior art three-phase, two-speed motor having a YY-Δ winding connection, such as the motor depicted in FIGS. 2a and 2b, is provided, illustrating the YY-Δ winding connection form between main winding coil groups A1', A2', B1', B2', C1', C2'. As will be readily understood by one of ordinary skill in the art upon review of this disclosure, a controller (not shown) connects leads (T1-T6 in FIGS. 2a, 2b, and 3) to power lines (L1-L3) of a suitable power supply (not shown) as summarized in the following table.

TABLE 1

| SPEED | L1 | L2 | L3 | OPEN | TOGETHER |
|---|---|---|---|---|---|
| LOW | T1 | T2 | T3 | T4, T5, T6 | NONE |
| HIGH | T4 | T5 | T6 | NONE | T1, T2, T3 |

Given the connections described above, the following table summarizes the number of effective turns within each coil group (in 2-pole, high-speed mode, the total effective turns N is the sum of each of the turns of the coils 76; in 4-pole, low-speed mode, the total effective turns is half of this amount, or N/2). The following table also indicates the phase winding form of each coil group relative to one another.

TABLE 2

| SPEED | PHASE VOLTAGE | TURNS | PHASE WINDING |
|---|---|---|---|
| LOW | 380 V | N/2 | SER |
| HIGH | 220 V | N | PAR |

In the conventional YY-Δ winding connection form for a three-phase, two-speed motor, described above, all of the coil groups A1', A2', B1', B2', C1', C2' are energized during both low-speed and high-speed operation modes. As a practical result, in the YY-Δ winding connection form, the high-speed mode is often too weak, and the low-speed mode is often too strong. Such a connection form thus makes the low-speed operation have a tendency to become very saturated at a light load, leading to a generally lower efficiency during the low-speed mode.

Figure 4A:
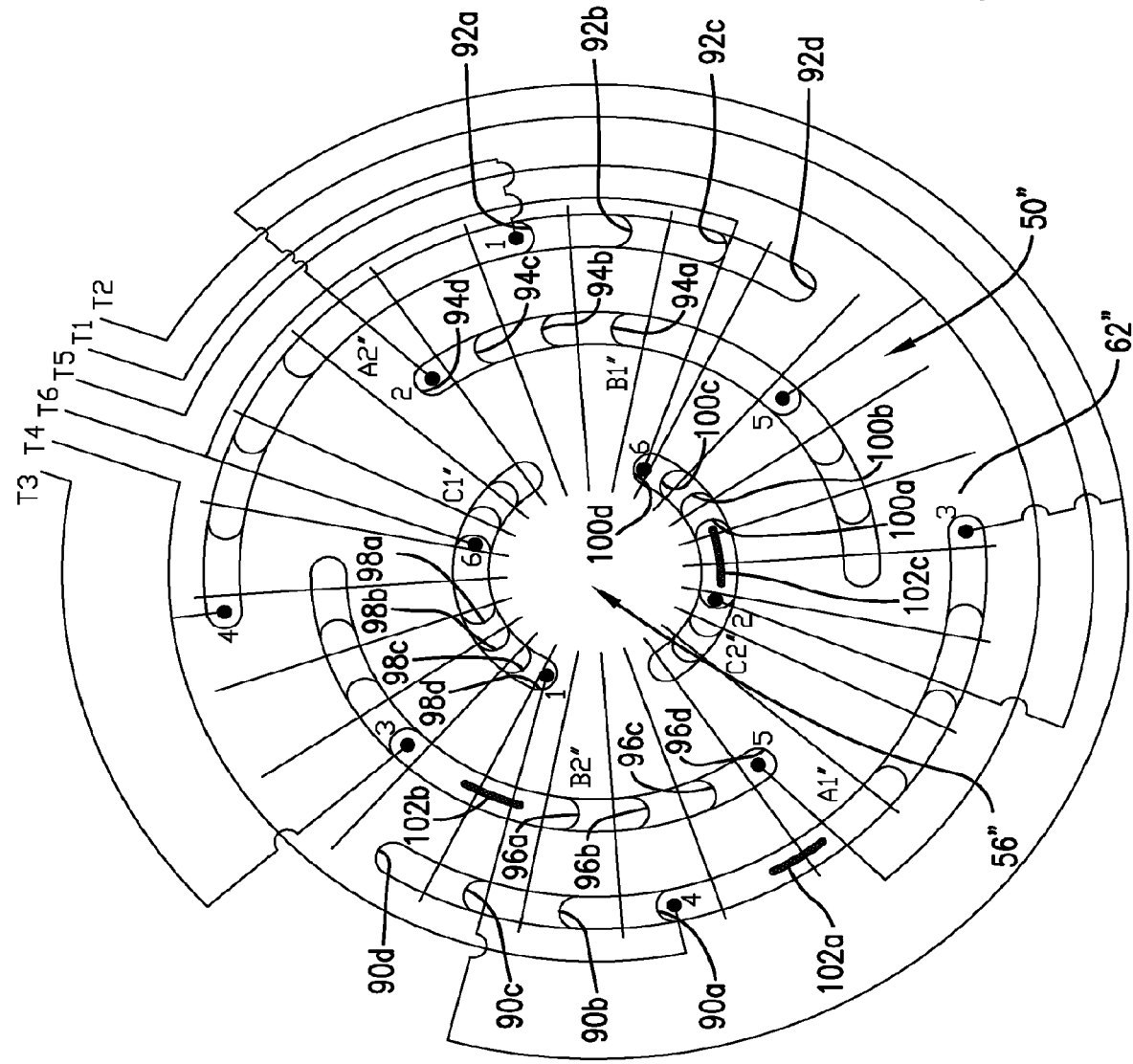
FIG. 4a is a schematic winding distribution diagram of a prior art three-phase, two-speed motor having a YY-Y winding connection, illustrating a pair of main winding coil groups corresponding with each phase arranged within slots of a stator core assembly, with the main winding coil groups each circumferentially spanning ten slots.
Figure 4B:
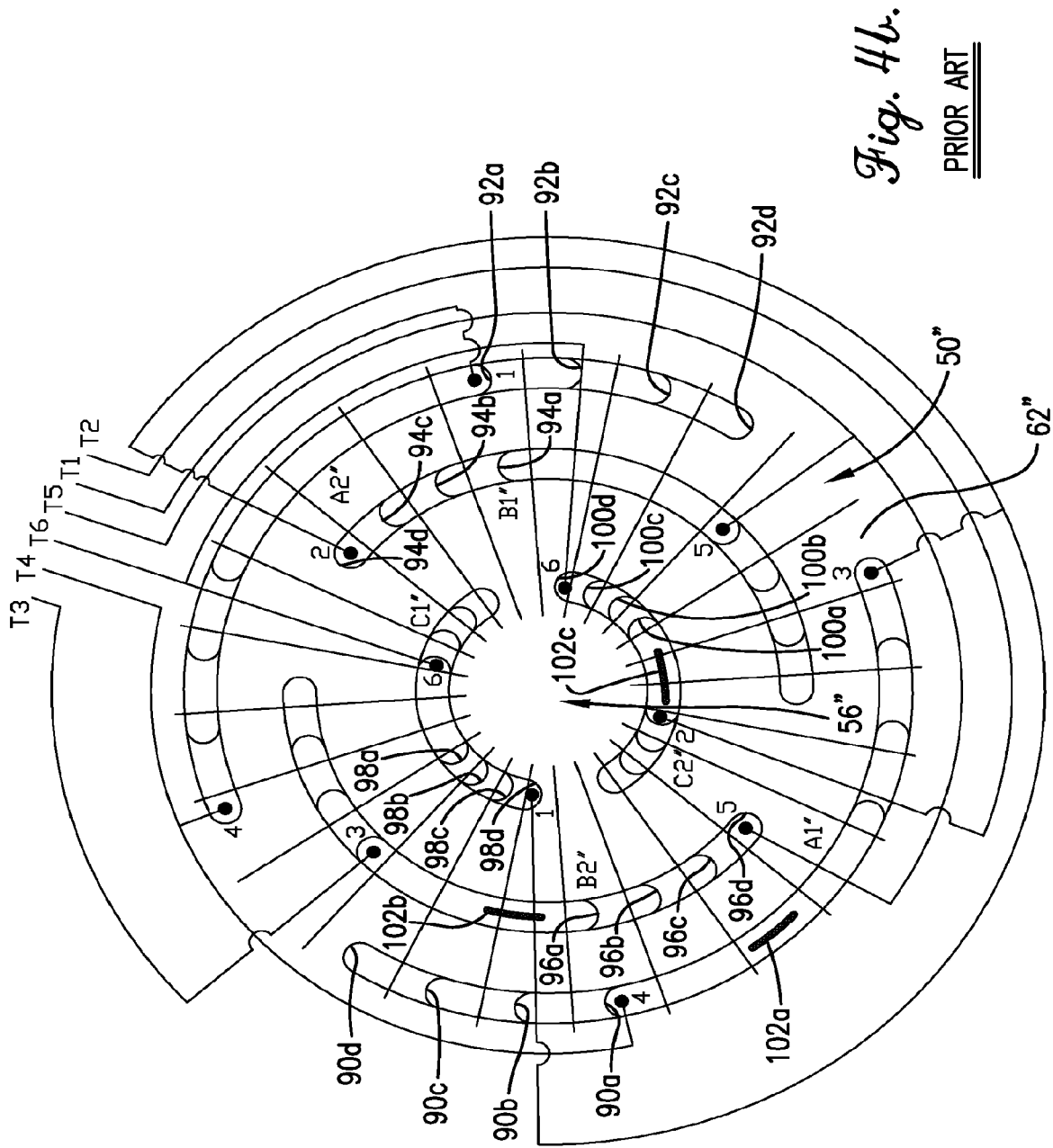
FIG. 4b is a schematic winding distribution diagram of a prior art three-phase, two-speed motor having a YY-Y winding connection, substantially similar to FIG. 4a, but with the main winding coil groups each circumferentially spanning eleven slots.
Figure 5:
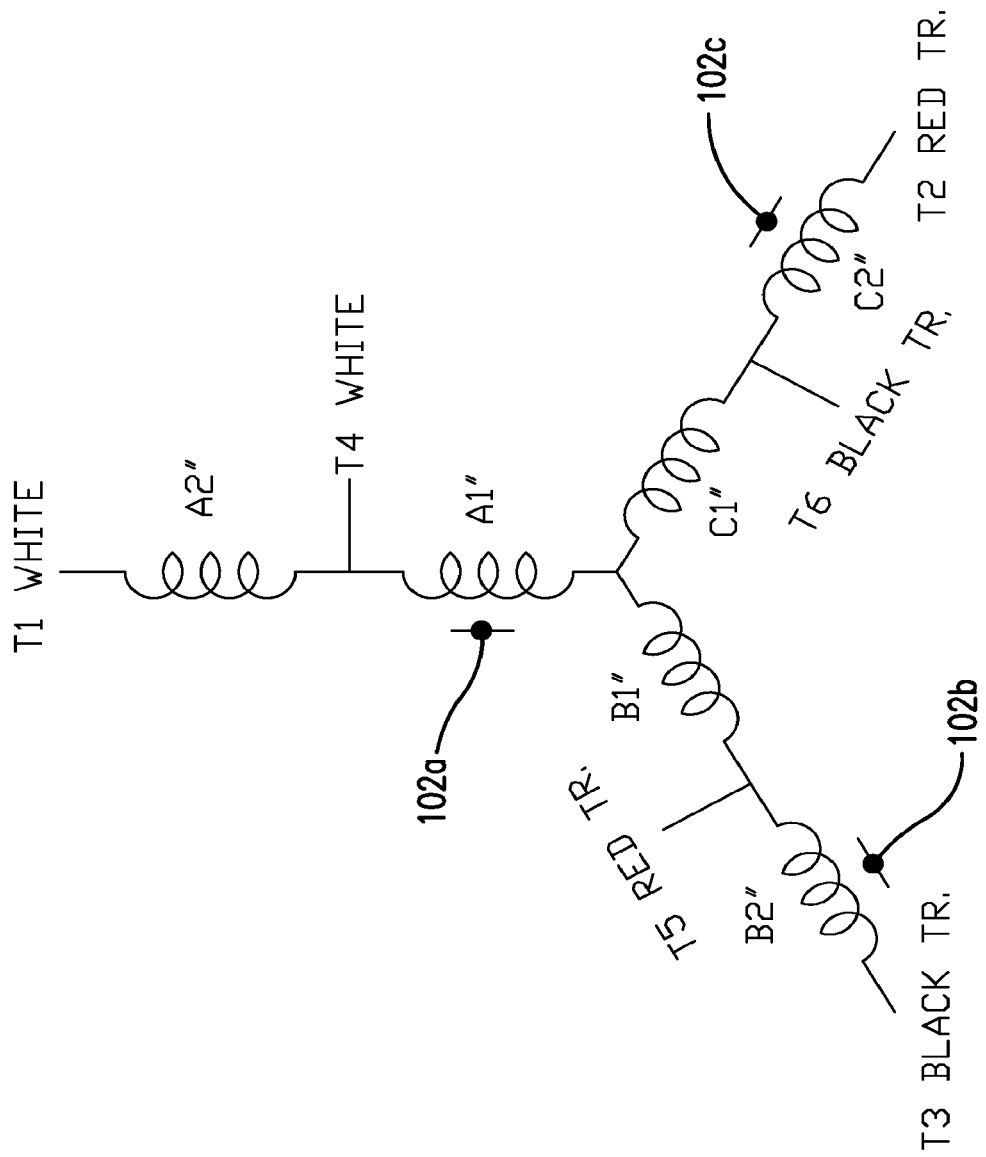
FIG. 5 is a schematic winding connection diagram of a prior art three-phase, two-speed motor having a YY-Y winding connection, such as the motor depicted in FIGS. 4a and 4b, illustrating the YY-Y winding connection form between main winding coil groups.

Turning now to the prior art YY-Y winding connection schematically depicted in FIGS. 4a, 4b, and 5, a prior art three-phase, two-speed motor (not shown) is provided with a YY-Y winding connection. FIGS. 4a and 4b depict schematic winding distribution diagrams of a pair of main winding coil groups A1", A2", B1", B2", C1", C2" corresponding with each phase arranged within slots 62" of a stator core 50". It is noted that FIGS. 4a and 4b are substantially similar, with the main winding coil groups A1", A2", B1", B2", C1", C2" each circumferentially spanning ten slots 62" in FIG. 4a and each circumferentially spanning eleven slots 62" in FIG. 4b.

In both FIGS. 4a and 4b, the main winding coil groups A1", A2", B1", B2", C1", C2" are disposed within the slots 62" and surround a central bore 56" that is configured to receive a rotor assembly (not shown) as will be readily appreciated by one of ordinary skill in the art. Each of the main winding coil groups includes four coils, such that the coil group A1" includes coils 90a, 90b, 90c, 90d, and the coil group A2" includes coils 92a, 92b, 92c, 92d. Similarly, the coil group B1" includes coils 94a, 94b, 94c, 94d, and the coil group B2" includes coils 96a, 96b, 96c, 96d. Also, the coil group C1" includes coils 98a, 98b, 98c, 98d, and the coil group C2" includes coils 100a, 100b, 100c, 100d.

A temperature sensor 102a, 102b, 102c is disposed generally centrally within one group of each phase pair of main coil groups, as will be readily understood by one of ordinary skill in the art upon review of this disclosure. The temperature sensors 102 facilitate data collection of the heat generated within each phase pair of coil groups. Each of the coils 90-100 includes a discrete number of turns, which may be different from other coils, although it is noted that the number of turns of corresponding coils between the phases (e.g., coil 90a of group A1" and coil 94a of group B1") are typically equal, as will be readily appreciated by one of ordinary skill in the art.

With attention now to FIG. 5, a schematic winding connection diagram of the prior art three-phase, two-speed motor having a YY-Y winding connection, such as the motor depicted in FIGS. 4a and 4b, is provided, illustrating the YY-Y winding connection form between main winding coil groups A1", A2", B1", B2", C1", C2". As will be readily understood by one of ordinary skill in the art upon review of this disclosure, a controller (not shown) connects leads (T1-T6 in FIGS. 4a, 4b, and 5) to power lines (L1-L3) of a suitable power supply (not shown) as summarized in the following table.

TABLE 3

| SPEED | L1 | L2 | L3 | OPEN | TOGETHER |
|---|---|---|---|---|---|
| LOW | T1 | T2 | T3 | T4, T5, T6 | NONE |
| HIGH | T4 | T5 | T6 | NONE | T1, T2, T3 |

Given the connections described above, the following table summarizes the number of effective turns within each coil group (in 2-pole, high-speed mode, the total effective turns N is the sum of each of the turns of the coils 90; in 4-pole, low-speed mode, the total effective turns is half of this amount, or N/2). The following table also indicates the phase winding form of each coil group relative to one another.

TABLE 4

| SPEED | PHASE VOLTAGE | TURNS | PHASE WINDING |
|---|---|---|---|
| LOW | 220 V | N/2 | SER |
| HIGH | 220 V | N | PAR |

In the conventional YY-Y winding connection form for a three-phase, two-speed motor, described above, all of the coil groups A1", A2", B1", B2", C1", C2" are energized during both low-speed and high-speed operation modes. As a practical result, in the YY-Y winding connection form, the high-speed mode is often too strong, and the low-speed mode is often too weak. Such a connection form thus makes the high-speed operation have a tendency to become very saturated at a light load, leading to a generally lower efficiency during the high-speed mode.

Figure 6A:
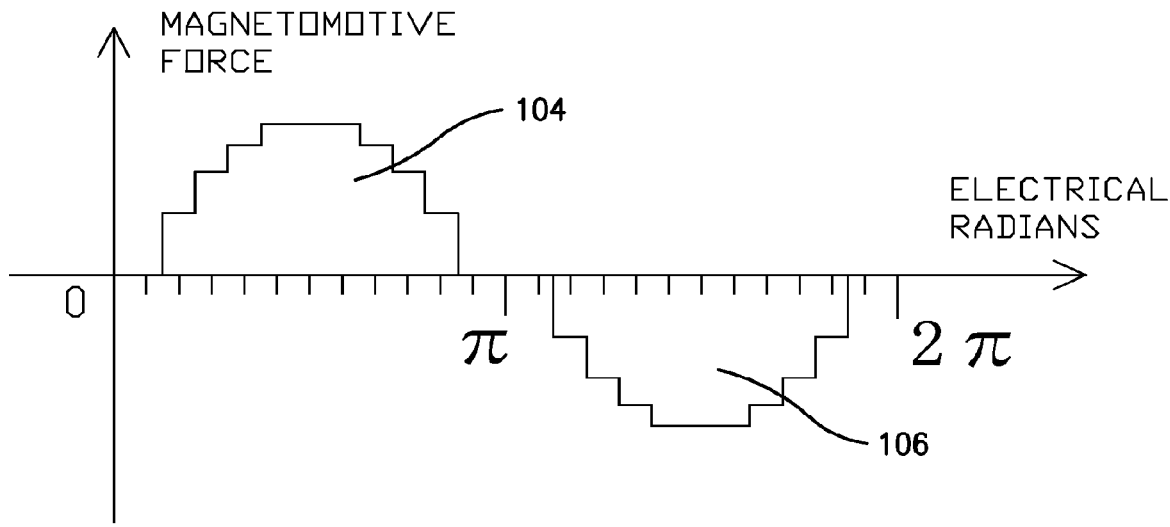
FIG. 6a is a chart including a general diagram depicting magnetomotive force versus electrical radians for the prior art three-phase, two-speed motor depicted in FIGS. 4 and 5 operating in a 2-pole, high-speed operation mode.
Figure 6B:
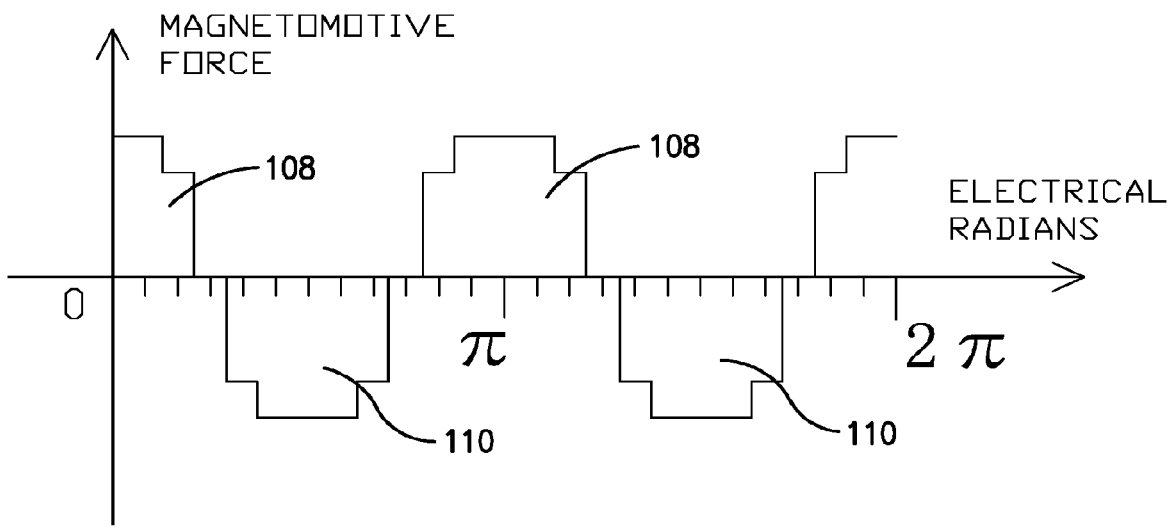
FIG. 6b is a chart including a general diagram depicting magnetomotive force versus electrical radians for the prior art three-phase, two-speed motor depicted in FIGS. 4 and 5 operating in a 4-pole, low-speed operation mode.

With reference to FIG. 6a, a chart including a general diagram depicting magnetomotive force versus electrical radians for the prior art three-phase, two-speed motor depicted in FIGS. 4 and 5 operating in a 2-pole, high-speed operation mode is shown. As will be readily appreciated by one of ordinary skill in the art, both the outline and total magnetomotive force between adjacent poles 104, 106 are substantially equal. FIG. 6b includes a similar chart including a general diagram depicting magnetomotive force versus electrical radians for the same prior art motor operating in a 4-pole, low-speed operation mode. As will be readily appreciated by one of ordinary skill in the art, both the outline and total magnetomotive force between adjacent poles 108, 110 are again substantially equal.

Those of ordinary skill in the art will appreciate that the difference in speed mode efficiencies between the YY-Δ and the YY-Y winding connection forms have essentially required a choice to be made as to which speed mode efficiency is of greater importance in a given application. Even with such a choice, it remains undesirable to suffer a lower efficiency during one of the speed modes, such as when trying to drive a light load at a very high efficiency.

Turning briefly now to electric motor efficiency, it may be readily appreciated by one of ordinary skill in the art that an energy cost associated with the operation of an electric motor over the lifetime of the motor can amount to a significant financial burden for an end user. Thus, an improvement in overall motor efficiency, even if such an improvement is only a relatively small percentage, can result in significant savings in energy costs over the lifetime of the motor. An inventive improvement to motor design or construction resulting in an efficiency gain, therefore, may provide significant competitive advantage.

With attention specifically now to the inventive 3T-Y winding connection schematically depicted in FIGS. 7a, 7b, and 8, the three-phase, multi-speed electric induction motor assembly 20 depicted in FIG. 1 is provided with a new 3T-Y winding connection. FIGS. 7a and 7b depict schematic winding distribution diagrams of a pair of main winding coil groups A1, A2, B1, B2, C1, C2 corresponding with each phase arranged within the slots 62 of the stator core 50. In addition, FIGS. 7a and 7b also depict schematic winding distribution diagrams of a pair of selectable extra winding coil groups A3, A4, B3, B4, C3, C4 corresponding with each phase, and each corresponding with a respective one of the main winding coil groups A1, A2, B1, B2, C1, C2. The selectable extra winding coil groups A3, A4, B3, B4, C3, C4 are also arranged within the slots 62 of the stator core 50.

In the depicted embodiment, each of the selectable extra winding coil groups A3, A4, B3, B4, C3, C4 is disposed generally circumferentially adjacent the corresponding main coil group A1, A2, B1, B2, C1, C2 for each phase. It is noted that FIGS. 7a and 7b are substantially similar, with the combination of each of the main winding coil groups and the associated selectable extra coil groups A1 and A3, A2 and A4, B1 and B3, B2 and B4, C1 and C3, C2 and C4, respectively, each circumferentially spanning ten slots 62 in FIG. 7a and each circumferentially spanning eleven slots 62 in FIG. 7b.

In both FIGS. 7a and 7b, the main winding coil groups A1, A2, B1, B2, C1, C2 and the selectable extra winding coil groups A3, A4, B3, B4, C3, C4 are disposed within the slots 62 and surround the central bore 56 that is configured to receive the rotor assembly 24 as will be readily appreciated by one of ordinary skill in the art. In the depicted embodiment, each of the main winding coil groups A1, A2, B1, B2, C1, C2 includes three generally concentrically wound coils, such that the main coil group A1 includes coils 112a, 112b, 112c, and the main coil group A2 includes coils 114a, 114b, 114c. Similarly, the main coil group B1 includes coils 116a, 116b, 116c, and the main coil group B2 includes coils 118a, 118b, 118c. Also, the main coil group C1 includes coils 120a, 120b, 120c, and the main coil group C2 includes coils 122a, 122b, 122c. It is noted that each of the main winding coil groups A1, A2, B1, B2, C1, C2 may alternatively include more or fewer than the three coils depicted herein and remain clearly within the ambit of the present invention.

Also in the depicted embodiment, each of the selectable extra winding coil groups A3, A4, B3, B4, C3, C4 include a single coil, such that the selectable extra coil group A3 includes coil 124, and the selectable extra coil group A4 includes coil 126. Similarly, the selectable extra coil group B3 includes coil 128, and the selectable extra coil group B4 includes coil 130. Also, the selectable extra coil group C3 includes coil 132, and the selectable extra coil group C4 includes coil 134. It is also noted that each of the selectable extra winding coil groups A3, A4, B3, B4, C3, C4 may alternatively include more than the single coil depicted herein and remain clearly within the ambit of the present invention.

A temperature sensor 136a, 136b, 136c is disposed generally centrally within one group of each phase pair of main coil groups A1, A2, B1, B2, C1, C2, as will be readily understood by one of ordinary skill in the art upon review of this disclosure. The temperature sensors 136 facilitate data collection of the heat generated within each phase pair of coil groups as a safety precaution, such that the motor assembly 20 can be shut down if any phase pair of coil groups begins to overheat.

Each of the main coils 112-122 includes a discrete number of turns, which may be different from a number of turns of other coils, although it is noted that the number of turns of corresponding coils between the phases (e.g., coil 112a of group A1 and coil 116a of group B1) are typically equal, as will be readily appreciated by one of ordinary skill in the art. Similarly, each of the selectable extra coils 124-134 includes a discrete number of turns, which may be different from a number of turns of other coils, although it is noted that since the selectable extra winding coil groups A3, A4, B3, B4, C3, C4 each include one of the single coils 124-134, the number of turns of each of the selectable extra coils 124-134 is equal, as will be readily appreciated by one of ordinary skill in the art upon review of this disclosure. Additional details regarding specific numbers of turns for sample embodiments are described below.

The main winding coil groups A1, A2, B1, B2, C1, C2 are energized both during the 2-pole, higher-speed operation and during the 4-pole, lower-speed operation. Conversely, the selectable extra winding coil groups A3, A4, B3, B4, C3, C4 are only energized during the 4-pole, lower-speed operation (that is, the selectable extra winding coil groups A3, A4, B3, B4, C3, C4 are not energized during the 2-pole, higher-speed operation). The higher- and lower-speed operation modes, and the corresponding energized coil groups associated therewith, are defined by first and second sets of three leads (T1-T6 in FIGS. 7a, 7b, and 8) to power lines (L1-L3) of a suitable power supply (not shown).

In the illustrated embodiment, with attention now to FIG. 8, a schematic winding connection diagram of the exemplary 3T-Y winding connection described in detail herein is provided, showing in detail the 3T-Y winding connection form between the main winding coil groups A1, A2, B1, B2, C1, C2, and between the selectable extra winding coil groups A3, A4, B3, B4, C3, C4. As will be readily understood by one of ordinary skill in the art upon review of this disclosure, the controller 22 connects the leads 64-74 (corresponding with leads T1-T6 in FIGS. 7a, 7b, and 8) to power lines (L1-L3) of a suitable power supply (not shown) as summarized in the following table.

TABLE 5

| SPEED | L1 | L2 | L3 | OPEN | TOGETHER |
|---|---|---|---|---|---|
| LOW | T1 | T2 | T3 | T4, T5, T6 | NONE |
| HIGH | T4 | T5 | T6 | NONE | T1, T2, T3 |

Given the connections and operation of the coil groups described above, the following table summarizes the number of effective turns within each coil group. For example, during 4-pole, lower-speed operation, the total effective turns for one energized phase group (A1) is only N/2, or half of the sum of each of the turns of only the main coils 112 (since the selectable extra coil 124 is not energized during the 4-pole, lower-speed mode). During 2-pole, higher-speed operation, on the other hand, the total effective turns for one energized phase group (A1+A3) is N+E, or the sum of each of the turns of the main coils 112 plus the turns of the selectable extra coil 124. The following table also indicates the phase winding form of each coil group relative to one another.

TABLE 6

| SPEED | PHASE VOLTAGE | TURNS | PHASE WINDING |
|---|---|---|---|
| LOW | 220 V | N/2 | SER |
| HIGH | 220 V | N + E | PAR/TWO-IN-HAND |

For the depicted embodiment described in detail herein, the combination of data presented in Tables 5 and 6 illustrates additional details regarding an exemplary embodiment of the new 3T-Y connection form.

During the 4-pole, lower-speed mode, the controller 22 operably connects leads T1, T2, and T3 to phase power lines L1, L2, and L3 of a suitable power supply (not shown), and operably holds leads T4, T5, and T6 open. Thus, in the 4-pole, lower-speed mode, only the main winding coil groups A1, A2, B1, B2, C1, C2 are energized, with the main winding coil groups A1, A2, B1, B2, C1, C2 within each phase being connected to one another in serial form.

During the 2-pole, higher-speed mode, on the other hand, the controller 22 operably connects leads T4, T5, and T6 to phase power lines L1, L2, and L3 of a suitable power supply (not shown), and operably connects leads T1, T2, and T3 together. Thus, in the 2-pole, higher-speed mode, both the main winding coil groups A1, A2, B1, B2, C1, C2 and the selectable extra winding coil groups A3, A4, B3, B4, C3, C4 are energized, with the main winding coil groups A1, A2, B1, B2, C1, C2 within each phase being connected to one another in parallel form and the selectable extra winding coil groups A3, A4, B3, B4, C3, C4 within each phase being connected to one another in serial form.

In the embodiment described in detail herein, the single coils 124-134 of the selectable extra winding coil groups A3, A4, B3, B4, C3, C4 are each wound two-in-hand, such that each single coil 124-134 presents double the number of effective turns. Winding the single coils 124-134 of the selectable extra winding coil groups A3, A4, B3, B4, C3, C4 two-in-hand allows for a thinner wire to be used for the single coils 124-134 while maintaining a resistance equal to that of a single wound thicker wire (the cross-sectional areas of two thinner wires compared to one thicker wire are approximately equal). Additionally, winding the single coils 124-134 of the selectable extra winding coil groups A3, A4, B3, B4, C3, C4 two-in-hand avoids the potential of energizing the selectable extra winding coil groups A3, A4, B3, B4, C3, C4 when the motor assembly 20 is operating in the lower-speed mode (when the selectable extra winding coil groups A3, A4, B3, B4, C3, C4 are not energized) by induction from the rotation of the rotor assembly 24. Unintentional energizing of the selectable extra winding coil groups A3, A4, B3, B4, C3, C4 by the rotor assembly 24 may otherwise cause undesirable watt loss and detrimentally decrease efficiency. Winding the single coils 124-134 of the selectable extra winding coil groups A3, A4, B3, B4, C3, C4 two-in-hand prevents such unintentional energizing during lower-speed operation.

With reference now to FIG. 9a, a chart including a general diagram depicting magnetomotive force versus electrical radians for the motor assembly 20 including the 3T-Y winding connection form depicted in FIGS. 7 and 8 operating in a 2-pole, higher-speed mode is shown. As will be readily appreciated by one of ordinary skill in the art, both the outline and total magnetomotive force between adjacent poles 138, 140 are substantially equal. FIG. 9b includes a similar chart including a general diagram depicting magnetomotive force versus electrical radians for the same motor assembly 20 including the 3T-Y winding connection form operating in a 4-pole, lower-speed mode. As will be readily appreciated by one of ordinary skill in the art, the outlines of the magnetomotive force between adjacent poles 142, 144 are slightly different, but the area representing the total magnetomotive force between adjacent poles 142, 144 are again substantially equal.

As noted above, the efficiency of an electric motor plays a large role in the energy cost associated with operation of the electric motor. Therefore, any improvement in overall motor efficiency, even if such improvement is only a relatively small percentage, can result in significant savings in energy costs over the lifetime of the motor, which can advantageously lower the financial burden on an end user. Testing has demonstrated that the electric induction motor assembly 20 constructed in accordance with a preferred embodiment of the present invention, as described in detail above, including the new 3T-Y winding connection form and the combination of main coil groups and selectable extra coil groups that are energized only in a selected speed mode, provides a notable overall gain in efficiency compared with prior art electric induction motor assemblies that have included conventional YY-Δ or YY-Y winding connection forms and coil groups that are all energized in all speed modes.

In a first test case, a first prior art motor including a conventional YY-Δ winding connection form and coil groups that are all energized in all speed modes was test run against a first embodiment of the electric induction motor assembly 20 described in detail above with the new 3T-Y winding connection form and the combination of main coil groups and selectable extra coil groups that are energized only in a selected speed mode. Both first test motors were run at three-hundred-eighty (380) volts and fifty (50) hertz, in both a 4-pole, low-speed mode and a 2-pole, high-speed mode. Additionally, both first test motors were rated at six (6) horsepower and included equal-sized stator cores, with a lamination stack size of four and five-eighths inches (4.625"), and presenting equal weights (54.814 ounces). The stator cores of both test motors included twenty-four (24) axial slots, with the windings of the first prior art motor including the conventional YY-Δ winding connection form spanning nine (9) slots and the windings of the new, inventive motor assembly 20 including the new 3T-Y winding connection form spanning eleven (11) slots.

An analysis of the construction of the new, inventive motor assembly 20 relative to the first prior art motor revealed that the slot fill percentage of the windings decreased (from 74.5% for the first prior art motor to 72.0% for the new motor) and that the weight of the winding material (copper, in the test case) remained almost constant (rising slightly from 7.602 ounces for the first prior art motor to 7.782 ounces for the new motor). Following operational testing, there were also noted differences in both the efficiency and break-down torque during each of the speed modes. In the low-speed mode, the efficiency advantageously rose (from 82.8% for the first prior art motor to 85.2% for the new motor) and the break-down torque advantageously decreased (from 718.8 ounce-feet for the first prior art motor to 488.7 ounce-feet for the new motor). In the high-speed mode, the efficiency also advantageously rose (from 86.6% for the first prior art motor to 90.2% for the new motor) and the breakdown torque advantageously increased (from 573.3 ounce-feet for the first prior art motor to 919.6 ounce-feet for the new motor).

Overall, the new, inventive electric induction motor assembly 20 (including the new 3T-Y winding connection form and the combination of main coil groups and selectable extra coil groups that are energized only in a selected speed mode) compared to the first prior art motor (including the conventional YY-Δ winding connection form and coil groups that are all energized in all speed modes) resulted in an overall efficiency gain. Additionally, conventional drawbacks regarding the YY-Δ winding connection form presenting a high-speed mode that is often too weak, and a low-speed mode that is often too strong have been overcome. The electric induction motor assembly 20 presents a break-down torque in the high-speed mode that is slightly more than half of the break-down torque in the low-speed mode, eliminating a disadvantage in the prior art YY-Δ winding connection form, as will be readily appreciated by one of ordinary skill in the art upon review of this disclosure.

In more detail regarding the first embodiment of the electric induction motor assembly 20 described in detail above with the new 3T-Y winding connection form, the following gauges of copper wire were used for the winding. The outside and middle of the main winding coil groups A1, A2, B1, B2 were wound with #17.50 gauge wire. The outside and middle of the selectable extra winding coil groups A3, A4, B3, B4 were also wound with #17.50 gauge wire. The inner of the main winding coil groups C1, C2 were wound with #17.75 gauge wire. The inner of the selectable extra winding coil groups C3, C4 were also wound with #17.75 gauge wire. Also, each coil within the groups included the following numbers of turns. Within the main winding coil groups A1, A2, B1, B2, C1, C2, coils 112*a*, 114*a*, 116*a*, 118*a*, 120*a*, 122*a* each included sixty (60) turns; coils 112*b*, 114*b*, 116*b*, 118*b*, 120*b*, 122*b* each included forty-four (44) turns; and coils 112*c*, 114*c*, 116*c*, 118*c*, 120*c*, 122*c* each included twenty-four (24) turns. Within the selectable extra winding coil groups A3, A4, B3, B4, C3, C4, each single coil 124, 126, 128, 130, 132, 134 included four (4) turns. It is noted that since the single coils 124, 126, 128, 130, 132, 134 were each wound two-in-hand, each single coil 124, 126, 128, 130, 132, 134 presented eight (8) effective turns.

In a second test case, a second prior art motor including a conventional YY-Y winding connection form and coil groups that are all energized in all speed modes was test run against a second embodiment of the electric induction motor assembly 20 described in detail above with the new 3T-Y winding connection form and the combination of main coil groups and selectable extra coil groups that are energized only in a selected speed mode. Both second test motors were run at three-hundred-eighty (380) volts and fifty (50) hertz, in both a 4-pole, low-speed mode and a 2-pole, high-speed mode. Additionally, both second test motors were rated at five (5) horsepower and included equal-sized stator cores, with a lamination stack size of four and seven-eighths inches (4.875"), and presenting equal weights (44.931 ounces). The stator cores of both test motors included twenty-four (24) axial slots, with the windings of the second prior art motor including the conventional YY-Y winding connection form spanning ten (10) slots and the windings of the new, inventive motor assembly 20 including the new 3T-Y winding connection form spanning eleven (11) slots.

An analysis of the construction of the new, inventive motor assembly 20 relative to the second prior art motor revealed that the slot fill percentage of the windings decreased (from 72.0% for the second prior art motor to 70.1% for the new motor) and that the weight of the winding material (copper, in the test case) remained almost constant (decreasing slightly from 6.304 ounces for the second prior art motor to 6.093 ounces for the new motor). Following operational testing, there were also noted differences in both the efficiency and break-down torque during each of the speed modes. In the low-speed mode, the efficiency advantageously rose (from 81.7% for the second prior art motor to 83.9% for the new motor) and the break-down torque advantageously increased (from 334.2 ounce-feet for the second prior art motor to 353.1 ounce-feet for the new motor). In the high-speed mode, the efficiency remained almost constant (with a slight decrease of less than a percentage point from 88.7% for the second prior art motor to 87.8% for the new motor) and the breakdown torque remained almost constant (increasing slightly from 682.4 ounce-feet to 696.3 ounce-feet for the new motor).

Overall, the new, inventive electric induction motor assembly 20 (including the new 3T-Y winding connection form and the combination of main coil groups and selectable extra coil groups that are energized only in a selected speed mode) compared to the second prior art motor (including the conventional YY-Y winding connection form and coil groups that are all energized in all speed modes) resulted in an overall efficiency gain. Additionally, conventional drawbacks regarding the YY-Y winding connection form presenting a high-speed mode that is often too strong, and a low-speed mode that is often too weak have been overcome. The electric induction motor assembly 20 presents a break-down torque in the high-speed mode that is slightly more than half of the break-down torque in the low-speed mode, eliminating a disadvantage in the prior art YY-Y winding connection form, as will be readily appreciated by one of ordinary skill in the art upon review of this disclosure.

In more detail regarding the second embodiment of the electric induction motor assembly 20 described in detail above with the new 3T-Y winding connection form, the following gauges of copper wire were used for the winding. The outside and middle of the main winding coil groups A1, A2, B1, B2 were wound with #19.00 gauge wire. The outside and middle of the selectable extra winding coil groups A3, A4, B3, B4 were also wound with #19.00 gauge wire. The inner of the main winding coil groups C1, C2 were wound with #19.25 gauge wire. The inner of the selectable extra winding coil groups C3, C4 were also wound with #19.25 gauge wire. Also, each coil within the groups included the following numbers of turns. Within the main winding coil groups A1, A2, B1, B2, C1, C2, coils 112a, 114a, 116a, 118a, 120a, 122a each included sixty-four (64) turns; coils 112b, 114b, 116b, 118b, 120b, 122b each included thirty-eight (38) turns; and coils 112c, 114c, 116c, 118c, 120c, 122c each included thirty-six (36) turns. Within the selectable extra winding coil groups A3, A4, B3, B4, C3, C4, each single coil 124, 126, 128, 130, 132, 134 included five (5) turns. It is noted that since the single coils 124, 126, 128, 130, 132, 134 were each wound two-in-hand, each single coil 124, 126, 128, 130, 132, 134 presented ten (10) effective turns.

From a review of the operational testing discussed above, it will be readily appreciated that an embodiment of the motor assembly 20 including the new 3T-Y winding connection form presents a lower-speed efficiency of at least about 84% and a higher-speed efficiency of at least about 88%. Moreover, another embodiment of the motor assembly 20 including the new 3T-Y winding connection form presents a lower-speed efficiency of at least about 85% and a higher-speed efficiency of at least about 90%. The improvements detailed above, including overcoming conventional drawbacks presented by prior art winding connections and more effectively balancing multiple speed efficiencies, are achievable without significant changes in manufacturing time or cost, thus providing a significant benefit in energy cost savings to an end user without requiring overly burdensome production costs that may otherwise offset such a benefit.

Furthermore, as will be readily appreciated by one of ordinary skill in the art upon review of this disclosure, many of the details of construction relating to the first and second embodiments of the electric induction motor assembly 20, described above in connection with the operational testing, may take alternative forms and/or otherwise vary significantly without departing from the teachings of the present invention. For example, details of construction (e.g., the stator core size, the specific wire gauges used for the coils, and the particular numbers of turns for each coil) may vary widely from the samples provided above based upon design considerations. One of ordinary skill in the art will understand that such variability between specific details of construction is common in the industry between motor assembly models, and that additional embodiments based upon variance of such details of construction remain firmly within the ambit of the present invention.

From the above detailed description, one of ordinary skill in the art will understand that the motor assembly 20 including the new 3T-Y winding connection form includes a special winding distribution to improve lower-speed efficiency over the known prior art connection form options. Furthermore, the motor assembly 20 including the new 3T-Y winding connection form includes selectable extra winding coil groups A3, A4, B3, B4, C3, C4 that correspond with the main winding coil groups A1, A2, B1, B2, C1, C2 to improve higher-speed efficiency over the known prior art connection form options. Thus, the new 3T-Y winding connection form described herein more effectively balances multiple speed efficiencies in a manner unrealized by prior art winding connections.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:

1. In a three-phase, multi-speed electric induction motor having a 2n-pole, higher-speed mode and a 4n-pole, lower-speed mode, where n is an integer greater than or equal to one, wherein the motor comprises a stator core assembly presenting axial slots and defining a central axial bore for receiving a rotor assembly, with n pair of main winding coil groups corresponding with each phase being disposed within the slots of the core assembly, and wherein the main coil groups are energized, with the main coil groups within each phase being connected to one another in serial form, when the motor is in the lower-speed mode, the improvement comprising:
 a selectable extra winding coil group corresponding with each main winding coil group, said selectable extra winding coil groups being disposed within the slots of the core assembly,
 said main coil groups and said selectable extra coil groups both being energized, with the main coil groups within each phase being connected to one another in parallel form and the selectable extra coil groups within each phase being connected to one another in serial form, when the motor is in the higher-speed mode.

2. In the electric induction motor as claimed in claim 1, each of said main coil groups including three generally concentrically wound coils.

3. In the electric induction motor as claimed in claim 1, each of said selectable extra coil groups including a single coil.

4. In the electric induction motor as claimed in claim 3, said single coil being wound two-in-hand such that the coil presents double the number of effective turns.

5. In the electric induction motor as claimed in claim 1, each of said selectable extra coil groups being disposed generally circumferentially adjacent the corresponding main coil group for each phase.

6. In the electric induction motor as claimed in claim 1, said main coil groups and said selectable extra coil groups cooperatively defining a generally axially concentric winding presenting six leads configured for connection to a power source.

7. In the electric induction motor as claimed in claim 1, wherein n is equal to one.

8. In the electric induction motor as claimed in claim 1, wherein the lower-speed mode has an efficiency of at least about 84% and the higher-speed mode has an efficiency of at least about 88%.

9. A three-phase, multi-speed electric induction motor assembly, said motor assembly comprising:
 a stator core assembly;
 a pair of main winding coil groups corresponding with each phase; and
 a pair of selectable extra winding coil groups corresponding with each phase,
 said coil groups being selectively adapted for a lower-speed operation and for a higher-speed operation, said lower-speed operation being defined by a first set of three leads being configured for connection to a power source such that only the main coil groups are energized, said higher-speed operation being defined by a second set of three leads being configured for connection to the power source such that the main coil groups and the selectable extra coil groups are both energized.

10. The electric motor assembly as claimed in claim 9, said lower-speed operation corresponding to a 4-pole configuration and said higher-speed operation corresponding to a 2-pole configuration.

11. The electric motor assembly as claimed in claim 10, said main coil groups within each phase being connected to one another in serial form during the 4-pole, lower-speed configuration, said main coil groups within each phase being connected to one another in parallel form and the selectable extra coil groups within each phase being connected to one another in serial form during the 2-pole, higher-speed configuration.

12. The electric motor assembly as claimed in claim 11; and
a digital lead-connecting controller operable to change the lead connection forms of the main coil groups and the selectable extra coil groups to correspond with the 4-pole, lower-speed configuration and the 2-pole, higher-speed configuration.

13. The electric motor assembly as claimed in claim 9, each main coil group including three generally concentrically wound coils.

14. The electric motor assembly as claimed in claim 13, each selectable extra coil group including a single coil.

15. The electric motor assembly as claimed in claim 14, each selectable extra coil group being disposed generally circumferentially adjacent the corresponding main coil group for each phase.

16. The electric motor assembly as claimed in claim 15, said single coil being wound two-in-hand such that the coil presents double the number of effective turns.

17. The electric motor assembly as claimed in claim 16, said lower-speed operation corresponding to a 4-pole configuration and said higher-speed operation corresponding to a 2-pole configuration, said main coil groups within each phase being connected to one another in serial form during the 4-pole, lower-speed configuration, said main coil groups within each phase being connected to one another in parallel form and the selectable extra coil groups within each phase being connected to one another in serial form during the 2-pole, higher-speed configuration.

18. The electric motor assembly as claimed in claim 9, said stator core assembly presenting a plurality of generally circumferentially arranged axial slots and defining a central axial bore for receiving a rotor assembly, said main coil groups and said selectable extra coil groups being disposed within the slots of the core assembly.

19. The electric motor assembly as claimed in claim 18, said stator core assembly comprising a plurality of axially stacked laminations.

20. The electric motor assembly as claimed in claim 19, said stator core assembly presenting twenty-four slots.

21. The electric motor assembly as claimed in claim 20, each combination of the main coil group and the associated selectable extra coil group for each phase spanning at least ten slots.

22. An electric induction motor assembly, said motor assembly comprising:
a stator core assembly;
a first phase main winding group wound on said stator core assembly and including a pair of first main winding coil groups;
a second phase main winding group wound on said stator core assembly and including a pair of second main winding coil groups;
a third phase main winding group wound on said stator core assembly and including a pair of third main winding coil groups;
a first phase selectable extra winding group wound on said stator core assembly and including a pair of first selectable extra winding coil groups;
a second phase selectable extra winding group wound on said stator core assembly and including a pair of second selectable extra winding coil groups; and
a third phase selectable extra winding group wound on said stator core assembly and including a pair of third selectable extra winding coil groups,
said winding groups being electrically connected during a 4-pole, low-speed operation such that only the first, second, and third main coil groups are energized, with the respective pairs of the first, second, and third main coil groups being connected to one another in serial form,
said winding groups being electrically connected during a 2-pole, high-speed operation such that the first, second, and third main coil groups and the first, second, and third selectable extra coil groups are energized, with the respective pairs of the first, second, and third main coil groups being connected to one another in parallel form and the respective pairs of the first, second, and third selectable extra coil groups being connected to one another in serial form.

23. The electric motor assembly as claimed in claim 22, said main coil groups and said selectable extra coil groups cooperatively defining a generally axially concentric winding presenting six leads configured for connection to a power source; and
a digital lead-connecting controller operable to change the lead connection forms of the main coil groups and the selectable extra coil groups to correspond with the 4-pole, low-speed operation and the 2-pole, high-speed operation.

24. The electric motor assembly as claimed in claim 22, each main coil group including three generally concentrically wound coils, and each selectable extra coil group including a single coil,
each of the pairs of the first, second, and third selectable extra coil groups being disposed generally circumferentially adjacent a respective one of the corresponding pairs of first, second, and third main coil groups.

25. The electric motor assembly as claimed in claim 24, each of said three generally concentrically wound coils of each main coil group presenting a different number of turns than at least one other of said three generally concentrically wound coils of said main coil group,
each of said single coils of each selectable extra coil group presenting a number of actual turns that is less than the number of turns in any of said three generally concentrically wound coils of said main coil group.

26. The electric motor assembly as claimed in claim 25, each of said single coils of each selectable extra coil group being wound two-in-hand such that the coil presents double the number of effective turns.

27. The electric motor assembly as claimed in claim 22,
said 2-pole, high-speed operation presenting a greater number of total energized coil groups than said 4-pole, low-speed operation.

28. The electric motor assembly as claimed in claim 27,
said 4-pole, low-speed operation running at an efficiency of at least about 84% and said 2-pole, high-speed operation running at an efficiency of at least about 88%.

29. The electric motor assembly as claimed in claim 27,
said stator core assembly comprising a plurality of axially stacked laminations that cooperatively present a plurality of generally circumferentially arranged axial slots and cooperatively define a central axial bore for receiving a rotor assembly,
said main coil groups and said selectable extra coil groups being disposed within the slots of the core assembly.

30. The electric motor assembly as claimed in claim 29,
said stator core assembly presenting twenty-four slots,
each of said first, second, and third main coil groups in combination with a respective circumferentially adjacent one of said first, second, and third selectable extra coil groups collectively spanning at least ten slots.

\* \* \* \* \*